Figure 1:
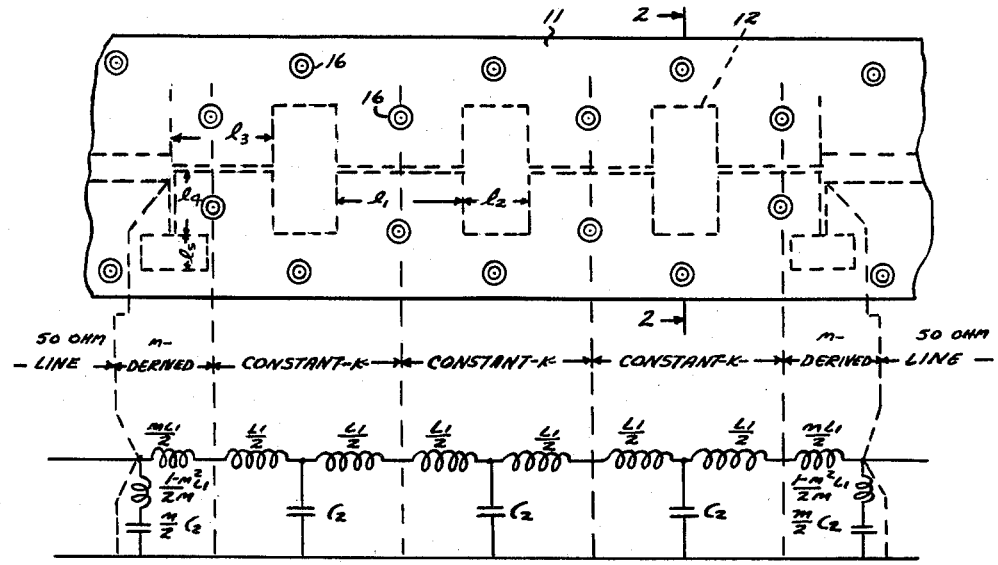

Jan. 26, 1960 R. A. VAN PATTEN 2,922,968
STRIP LINE MICROWAVE FILTERS
Filed July 23, 1957 3 Sheets-Sheet 1

INVENTOR.
RICHARD A. VAN PATTEN
BY Wade Koontz
ATTORNEY
James S. Shannon
AGENT

Jan. 26, 1960    R. A. VAN PATTEN    2,922,968
STRIP LINE MICROWAVE FILTERS
Filed July 23, 1957    3 Sheets-Sheet 3

INVENTOR.
RICHARD A. VAN PATTEN
BY
ATTORNEY
AGENT

United States Patent Office

2,922,968
Patented Jan. 26, 1960

2,922,968

STRIP LINE MICROWAVE FILTERS

Richard A. Van Patten, Schenectady, N.Y., assignor to the United States of America as represented by the Secretary of the Air Force Application July 23, 1957, Serial No. 673,743

8 Claims. (Cl. 333—73)

(Granted under Title 35, U.S. Code (1952), sec. 266)

The invention described herein may be manufactured and used by or for the United States Government for governmental purposes without payment to me of any royalty thereon.

In low pass strip line microwave filters the lumped inductive and capacitive elements of the ladder prototype are replaced by cascaded short sections of strip transmission line, the lengths and characteristic impedances of which are selected to give the required values of inductance and capacitance.

The strip transmission line used in such filters usually consists of a thin rectangular conductor centered between parallel ground planes. This form of transmission line may be physically realized in a number of ways, but is particularly suited to printed circuit techniques. The form of the center conductor may be photo-etched on one side of each of two equal strips of a commercially available metal clad dielectric material. The strips are then clamped together with the center conductors touching and in register to form the transmission line.

For electrically short lengths of transmission line of the above type, the inductance is directly proportional to both the length and the characteristic impedance, while the capacitance is directly proportional to the length but inversely proportional to the characteristic impedance. The characteristic impedance in turn is inversely related to the width of the center conductor. Therefore, a length of line having a narrow center conductor is used for an inductive element, and one having a wide center conductor is used for a capacitive element.

The lengths of the short sections of strip transmission line connected in cascade to form the inductive and capacitive elements of a low pass filter are limited by spurious responses, which must be made to fall outside the operating frequency band of the filter. A spurious response may be expected where either the inductive or the capacitive sections of the filter become antiresonant; that is, where the electrical length of either, expressed in radians, becomes equal to a multiple of $\pi$. Usually the length of the inductive sections exceeds that of the capacitive sections so that the former is the governing factor in determining the first or lowest spurious response frequency. Further, the characteristic impedances of the line sections are dictated by the electrical lengths of the sections at the cut-off frequency of the filter and the impedance level of the system in which the filter is to operate. Therefore, with the characteristic impedance specified, a problem is created in the design of the inductive sections in that the center conductor size required for the specified characteristic impedance may be impractically small for a printed circuit. Since the characteristic impedance of a strip line section is inversely related to both the dielectric constant of the insulating material used and the width of the center conductor, the use of air dielectric in the inductive sections would alleviate the problem since the lowered dielectric constant would permit a wider center conductor without lowering the characteristic impedance. However, the use of air dielectric in the inductive sections of a strip line filter made by printed circuit methods is not feasible for structural reasons, the solid dielectric being required to support the metallic films forming the ground planes of the line.

It is accordingly the object of this invention to provide a design for the inductive sections of a strip line filter constructed from metal clad dielectric strip, or the equivalent, that permits a practical center conductor size while keeping the length of the section within the limit imposed by spurious response considerations. The design is based on the discovery that the effective dielectric constant may be reduced nearly to that of air or unity by cutting away the solid dielectric surrounding the center conductor along an equipotential surface, while leaving sufficient dielectric material to support the ground planes. The center conductor in this case may take the form of a fine wire stretched across the gap left by the removed solid dielectric. Since, as stated above, the characteristic impedance of the line is inversely related to both the dielectric constant and the center conductor size, this reduction in dielectric constant permits a greater center conductor size without lowering the characterisic impedance from its specified value. Although the equipotential surface is elliptical, it is found that an approximating cylindrical surface will produce substantially equal results and simplifies the fabrication of the filter.

Figure 2:
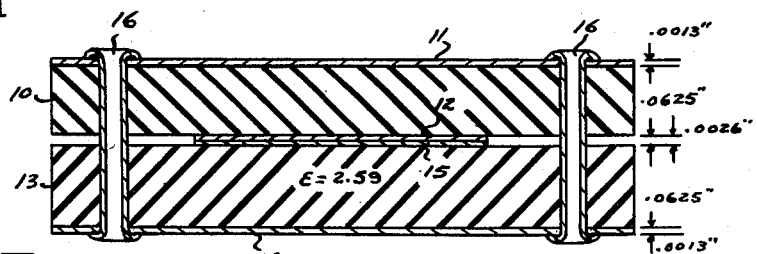
Figure 3:
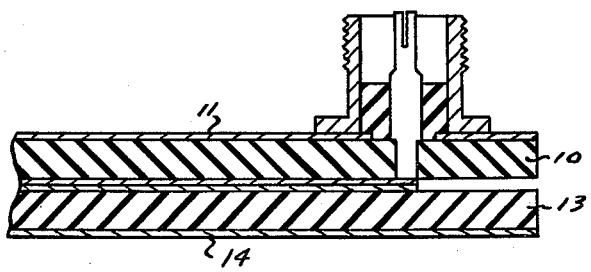
Figure 6A:
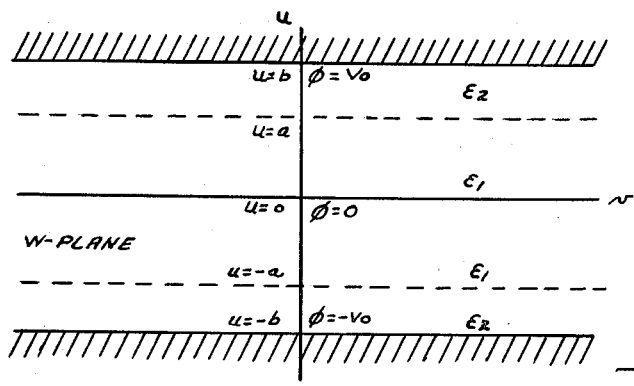
Figure 6B:
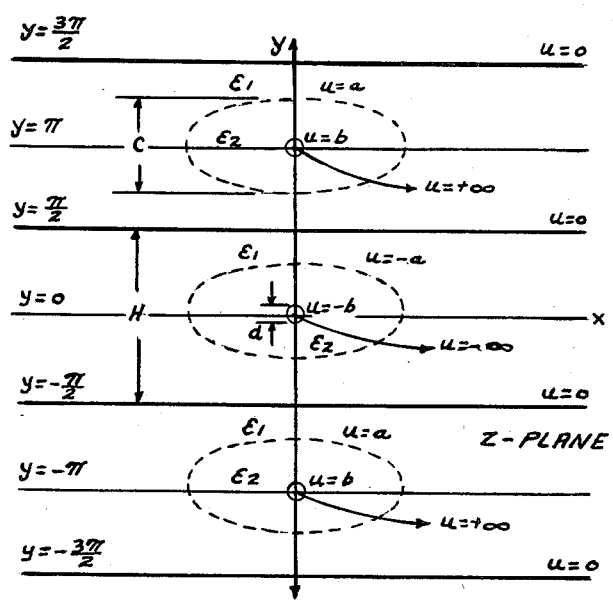
Figure 4:
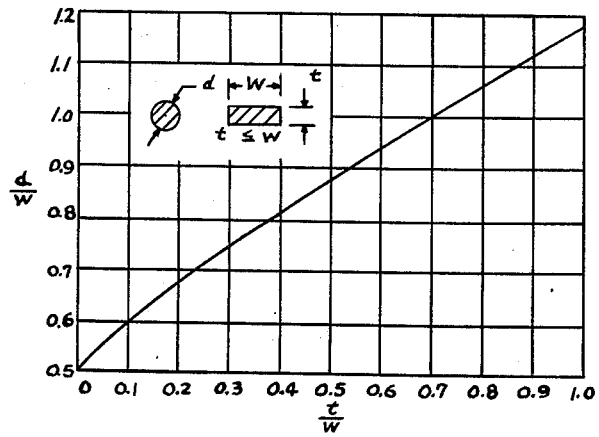
Figure 5:
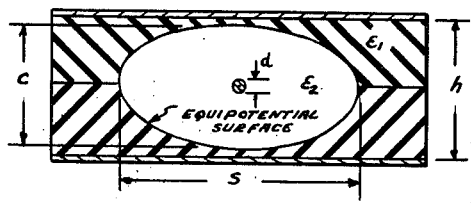
Figure 7:
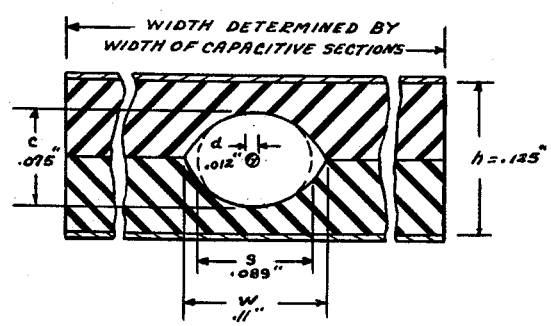
Figure 8:
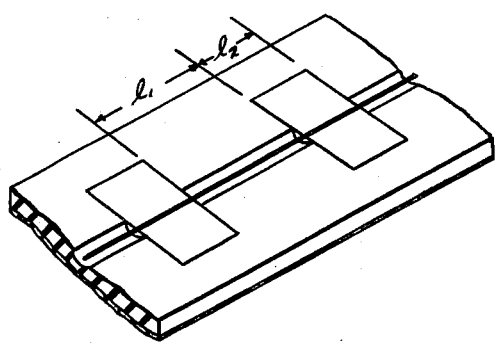

A more detailed description of the invention will be given in connection with the specific embodiment thereof shown in the accompanying drawings, in which:

Fig. 1 illustrates a typical strip line low pass filter together with its lumped element counterpart, Fig. 2 is a section through the filter of Fig. 1, Fig. 3 illustrates a method of coupling to the filter, Fig. 4 gives the equivalence between circular and rectangular center conductors in strip line filters, Fig. 5 is a cross section of strip transmission line showing the solid dielectric removed from around the center conductor in accordance with the invention, Figs. 6a and 6b are illustrations relating to the derivation of a formula for the characteristic impedance of a strip line of the type shown in Fig. 5, Fig. 7 is a cross section of a specifically designed inductive strip line section incorporating the invention, and Fig. 8 is a perspective view of a section of one half of a strip line filter incorporating the invention.

Fig. 1 shows a typical low pass strip line filter together with its lumped element counterpart, corresponding parts of the two equivalent filters being located between the same pairs of vertical broken lines. The filters are seen to consist of three cascaded constant-$k$ T-sections terminated by $m$-derived impedance matching half-sections. The value of $m$ would normally be 0.6 in order that the characteristic impedance of the composite filter, in this case 50 ohms, be constant over substantially the entire pass band.

The structural details of the above strip line filter are shown in Figs. 1 and 2. The filter consists of a center conductor, the outline of which is shown dotted in Fig. 1, sandwiched between two strips of insulating material, the outer surfaces of which have metallic coatings to form the ground planes. The filter may be fabricated from dielectric strips that are metal clad on both sides. Sufficient metal is removed from one side of each, by photo-etching techniques, for example, to form mirror images in metal of the center conductor. The two strips are then clamped together with the center conductors in register and pressed into electrical contact to form, in effect, a single center conductor. This construction is shown more clearly in the enlarged cross-section of Fig. 2 where dielectric strip 10, having an outer metallic coating 11, has sufficient metal removed from the coating of its inner surface to leave only the center conductor 12 having the form shown in dotted outline in Fig. 1. The dielectric strip 13 similarly has an outer metallic coating 14 and its inner coating is removed except for the center conductor portion 15. The conductor 15 is made a mirror image of the conductor 12 so that when superposed in contact a single conductor is formed as stated above. It is, of course, possible to form the center conductor on only one of the dielectric strips; however, formation on both strips, as described above, has certain advantages among which are more constant spacing between center conductor and ground planes. The strips 10 and 13 are clamped together by any suitable means such as the hollow rivets 16 shown. These rivets also form the additional function of holding the ground planes at the same potential thus discouraging the spurious propogation of energy through the filter at the higher waveguide modes. In Fig. 2 the metallic coating thickness is shown greatly exaggerated for clarity, and therefore representative dimensions for a strip line filter are given to show the true relative sizes. The thickness of the metal coating is usually from .001" to .002" and, therefore, strips 10 and 13, although shown separated in the drawing, will actually be in contact when clamped together because of the slight thickness of metal between them.

The series inductance L and the shunt capacitance C provided by a short length of lossless transmission line are given by the following expressions:

(1) $$L = \frac{Z_0 l}{v}$$

(2) $$C = \frac{l}{Z_0 v}$$

where $Z_0$ is the characteristic impedance, $l$ is the length of the short line section and $v$ is the velocity of propagation. In Fig. 1, the inductance $L_1$ is the total series inductance and $C_2$ the total shunt capacitance of each of the T-sections. The inductance is the sum of the inductances supplied by the lengths $l_1$ and $l_2$ of the strip transmission line and may be expressed as follows:

(3) $$L_1 = \frac{Z_{01} l_1}{v} + \frac{Z_{02} l_2}{v}$$

where $Z_{01}$ and $Z_{02}$ are the characteristic impedances of the $l_1$ and $l_2$ line sections, respectively. The $l_1$ section, which has a narrow center conductor and high characteristic impedance, supplies substantially all of the inductance $L_1$ and is therefore referred to as an inductive section. Similarly, the capacitance is the sum of the capacitance supplied by the lengths $l_1$ and $l_2$ of the strip transmission line and may be expressed as follows:

(4) $$C_2 = \frac{l_1}{Z_{01} v} + \frac{l_2}{Z_{02} v}$$

In this case the $l_2$ section, which has a wide center conductor and low characteristic impedance, supplies substantially all of the capacitance $C_2$ and therefore is referred to as a capacitive section.

At the ends of the transmission line a high impedance inductive section $l_3$ supplies the inductance $$\frac{L_1}{2}$$

(except for the minor part $$\frac{Z_{02} l_2}{v}$$

supplied by the adjacent capacitive section) and in addition the series inductance $$\frac{m L_1}{2}$$

of the m-derived half-section. The inductance $$\frac{1-m^2}{2m} L_1$$

and capacitance $$\frac{m}{2} C_2$$

of the shunt arm of the terminating half-section are supplied by length $l_4$ of high impedance line and length $l_3$ of low impedance line.

The filter is illustrated as being designed to have an impedance of 50 ohms, and 50 ohm transmission lines are shown extending away from each end. These lines may be continued indefinitely or they may be coupled to other types of transmission lines in any suitable manner. For example, a coupling to a coaxial transmission line is shown in Fig. 3.

The difficulty that arises in designing an inductive section for a strip line filter may best be illustrated by a specific example:

Assume that the inductive sections are to be designed for a low pass filter of the type shown in Fig. 1 and for which the specifications are:

$f_c$ (cut-off frequency) = 1875 mc./s.
$R$ (working impedance) = 50 ohms
First spurious response not below 4.5 $f_c$ Assume further that the line is to be constructed from metal clad dielectric sheet, such for example as copper clad Teflon Fiberglas board in which the copper coating has a thickness of 0.0013", the dielectric has a thickness of 0.0625", these dimensions being illustrated in Fig. 2, and in which the dielectric constant $\epsilon$ of the dielectric is 2.59.

In the design of lumped element filters it is customary to work with values of inductance, capacitance and the cut-off frequency. In designing transmission line filters it is more convenient to work with characteristic impedance and the electrical lengths of the line sections at the cut-off frequency, and for this method the following equations are available:

(5) $$\rho = \frac{Z_{01}}{Z_{02}} = \frac{\cot \frac{\theta_{2c}}{2}}{\tan \frac{\theta_{1c}}{2}}$$

and (6) $$\frac{Z_{01}}{R} = \sqrt{\frac{\frac{\theta_{1c}}{\theta_{2c}} + \rho}{\frac{\theta_{1c}}{\theta_{2c}} + \frac{1}{\rho}}}$$

where $Z_{01}$ is the characteristic impedance of the inductive sections $Z_{02}$ is the characteristic impedance of the capacitive sections $\theta_{1c}$ is the electrical length of the inductive sections at cut-off $\theta_{2c}$ is the electrical length of the capacitive sections at cut-off $R$ is the impedance into which the filter is to work If the first spurious response must not occur under 4.5 $f_c$ then (7) $$\theta_{1c} = \frac{180}{4.5} = 40°$$

A lesser value of $\theta_{2c}$, for example, 30°, may be chosen. Substituting these values together with $R = 50$ in Equations 5 and 6:

(8) $$\rho = \frac{Z_{01}}{Z_{02}} = \frac{\cot 15°}{\tan 20°} = \frac{3.73}{.364} = 10.25$$

(9) $$\frac{Z_{01}}{50} = \sqrt{\frac{\frac{40}{30} + 10.25}{\frac{40}{30} + \frac{1}{10.25}}} = 2.84$$

and

(10) $\quad Z_{01} = 50 \times 2.84 = 142 \text{ ohms}$

For a strip transmission line having a very small circular center conductor, the following expression for the characteristic impedance is available:

$$Z_0 = \frac{60}{\sqrt{\epsilon}} \ln \frac{4h}{\pi d} \text{ ohms}$$

where $h$ is the ground plane spacing
$d$ is the diameter of the center conductor
$\epsilon$ is the dielectric constant of the insulator filling the space between the ground planes and containing the center conductor This formula is approximate for finite center conductor size and becomes exact as the conductor size approaches zero. While the formula itself applies only to the case of a circular conductor centered between ground planes a curve showing the equivalence between the rectangular and circular cross sections is shown in Fig. 4.

Substituting the constants for the line shown in Fig. 2, assuming $b = 2 \times .0625 = .125''$, and the required characteristic impedance $Z_{01}$ of the inductive section in Equation 10

(11) $\quad 142 = \frac{60}{\sqrt{2.59}} \ln \frac{4 \times 0.125}{\pi d}$ from which $$d = \frac{4 \times 0.125}{\pi \ln^{-1} \frac{142 \ 2.59}{60}} = \frac{.5}{45\pi} = .00354''$$

The width $W$ of the equivalent rectangular conductor having a thickness $t = 2 \times .0013'' = .0026''$, as determined from the curve of Fig. 4, is .00344''. This width is impractically small for printed circuit or photo-etching techniques since the conductor would be subject to breakage and would have excessive resistance.

As seen from Equation 10 the characteristic impedance is inversely related to both the dielectric constant of the solid insulating material in the strip line and the size of the center conductor. Therefore, lowering the dielectric constant will permit an increase in the size of the center conductor without changing the characteristic impedance. In accordance with the invention a decrease in dielectric constant sufficient to permit a center conductor of practical size is accomplished by removing a certain amount of the solid dielectric extending from the center conductor to an equipotential surface as illustrated in Fig. 5.

An expression for the characteristic impedance of a transmission line consisting of a small circular conductor centered between parallel ground planes with two dielectrics, the dielectric boundary being along an equipotential surface, will now be derived. The problem may be solved by conformal transformations, referring to Figs. 6a and 6b:

The transformation equation

(12) $\quad W = \ln \frac{e^Z - 1}{e^Z + 1}$ transforms the parallel plane structure in the W-plane shown in Fig. 6a into the desired structure in the Z-plane shown in Fig. 6b. The first portion of the problem is to find the characteristic impedance of the two dielectric parallel plane structure of Fig. 6a.

In Fig. 6a, a very thin conductor at $u = 0$ and a conductor at $u = \pm b$ are assumed. The dielectric boundary is at $u = \pm a$. The first step is to satisfy the boundary conditions and solve for the characteristic impedance of the region from $u = 0$ to $u = b$ and $v_1 - v_2 = 2\pi$. The reason for selecting this region is that it corresponds to a single one of the multiplicity of similar structures in Fig. 6b.

In each of the two dielectrics of this region the potentials

(13) $\quad \phi_1 = C_1 u$

(14) $\quad \phi_2 = C_2 u + C_3$

At the conductors, the boundary conditions are

(15) $\quad$ at $u = 0, \phi_1 = 0$

(16) $\quad$ at $u = b, \phi_2 = V_0$

At the dielectric boundary, the necessary conditions are

(17) $\quad$ at $u = a, \phi_1 = \phi_2$

(18) $\quad$ at $u = a, \epsilon_1 \frac{d\phi_1}{du} = \epsilon_2 \frac{d\phi_2}{du}$ Applying (18) to (13) and (14),

(19) $\quad \epsilon_1 C_1 = \epsilon_2 C_2$

Using (19) to eliminate $C_2$ from (14)

(20) $\quad \phi_2 = \frac{\epsilon_1}{\epsilon_2} C_1 u + C_3$

Applying condition (16) and then condition (17) to (20) and (13),

(21) $\quad V_0 = \frac{\epsilon_1}{\epsilon_2} C_1 b + C_3$

(22) $\quad C_1 a = \frac{\epsilon_1}{\epsilon_2} C_1 a + C_3$

Solving (21) and (22) for $C_1$ and $C_3$

(23) $\quad C_1 = \frac{V_0}{\frac{\epsilon_1}{\epsilon_2}(b-a) + a}$

(24) $\quad C_3 = \frac{a V_0}{\frac{\epsilon_1}{\epsilon_2}(b-a) + a}\left(1 - \frac{\epsilon_1}{\epsilon_2}\right)$ Substituting (23) and (24) into (13) and (14)

(25) $\quad \phi_1 = \frac{V_0 u}{\frac{\epsilon_1}{\epsilon_2}(b-a) + a}$

(26) $\quad \phi_2 = \frac{\frac{\epsilon_1}{\epsilon_2} V_0 u}{\frac{\epsilon_1}{\epsilon_2}(b-a) + a} + \frac{a V_0}{\frac{\epsilon_1}{\epsilon_2}(b-c) + a}\left(1 - \frac{\epsilon_1}{\epsilon_2}\right)$ The charge per unit area on the conductor is obtained by differentiation of either (25) or (26).

(27) $\quad Q = \epsilon_1 \frac{d\phi_1}{du} = \frac{\epsilon_1 V_0}{\frac{\epsilon_1}{\epsilon_2}(b-a) + a}$ coulombs/meter$^2$ For a strip of width $v_1 - v_2 = 2\pi$ the capacitance would be

(28) $\quad C_0 = \frac{2\pi \epsilon_1}{\frac{\epsilon_1}{\epsilon_2}(b-a) + a}$ farads/meter The inductance per unit length of this strip would be

(29) $\quad L_0 = \frac{\mu_0 b}{2\pi}$ henrys/meter

The characteristic impedance of this strip is

(30) $\quad Z_0 = \sqrt{\frac{L_0}{C_0}} = \left[\frac{\mu_0 b}{2\pi} \frac{\frac{\epsilon_1}{\epsilon_2}(b-a) + a}{2\pi \epsilon_1}\right]^{\frac{1}{2}}$ ohms where $L_0$ is the inductance per unit length
$C_0$ is the capacitance per unit length Simplifying (30)

(31) $\quad Z_0 = \frac{60}{\sqrt{\epsilon_1}}\left[b\left(\frac{\epsilon_1}{\epsilon_2}(b-a) + a\right)\right]^{\frac{1}{2}}$ which is the characteristic impedance of the two dielectric parallel plane transmission line of Fig. 6a.

Returning to the transformation Equation 12, this equation may be written as

(32) $$e^W = \frac{e^Z - 1}{e^Z + 1}$$

where
$$W = u + jv$$
$$Z = x + jy$$

so that

(33) $$e^u e^{jv} = \frac{e^x e^{jy} - 1}{e^x e^{jy} + 1}$$

Equating the square of the real parts

(34) $$K = \frac{(e^x \cos y - 1)^2 + e^{2x} \sin^2 y}{(e^x \cos y + 1)^2 + e^{2x} \sin^2 y}$$

where
$$K = e^{2u}$$

(34) may be put into the form

(35) $$e^{2x} - 2e^x \frac{1+K}{1-K} \cos y + 1 = 0$$

from which $$x = \ln\left[\frac{1+K}{1-K} \cos y + \sqrt{\left(\frac{1+K}{1-K}\right)^2 \cos^2 y - 1}\right]$$

which is recognized to be $$x = \cosh^{-1}\left(\frac{1+K}{1-K} \cos y\right)$$

or

(36) $$\cos y = \frac{1-K}{1+K} \cosh x$$

which is the equation for the equipotential lines of Fig. 6b.

For large values of $u$ the equipotential lines are nearly circular with centers at the points $x=0$, $y=\pm n$ where $n=0, 1, 2 \ldots$ in the Z plane. When $u=0$ the equipotential lines are straight lines parallel to the $x$ axis as shown in Fig. 6b. For intermediate values of $u$ the equipotential lines are closed curves resembling ellipses but not having the equations of ellipses.

The next step is to obtain expressions for $a$ and $b$ in terms of $c/h$ and $d/h$ (Fig. 5), respectively, for substitution in Equation 31. The dimensions $c$ and $d$ are read along the $y$ axis so in Equation 36 set $x=0$.

(37) $$y = \cos^{-1} \frac{1-K}{1+K}$$

From inspection of Fig. 6b.

(38) $$y_a = \frac{c\pi}{2h} = \frac{1 - e^{-2a}}{1 + e^{-2a}}$$

and

(39) $$y_b = \frac{d\pi}{2h} = \frac{1 - e^{-2b}}{1 + e^{-2b}}$$

(38) and (39) are readily solved for $a$ and $b$, respectively, to obtain the desired expressions

(40) $$a = \ln \operatorname{ctn} \frac{c\pi}{4h}$$

(41) $$b = \ln \operatorname{ctn} \frac{d\pi}{4h}$$

(40) and (41) may now be substituted into (31) to obtain the desired characteristic impedance formula. However, it is more convenient to write the formula in the following way

(42) $$Z_0 = \frac{60}{\sqrt{\epsilon_1}} \left[b\left(\frac{\epsilon_1}{\epsilon_2}(b-a) + a\right)\right]^{1/2} \text{ohms}$$

where $$a = \ln \operatorname{ctn} \frac{c\pi}{4h}$$

$$b = \ln \operatorname{ctn} \frac{d\pi}{4h}$$

$c$ is the height of the dielectric boundary
$d$ is the diameter of the center conductor
$h$ is the ground plane spacing Also the width $s$ (Fig. 5) of the equipotential surface is given by the expression $$s = \frac{2h}{\pi} \cosh^{-1} \frac{1 + e^{-2a}}{1 - e^{-2a}}$$

which is easily obtained from Equation 37 and Figs. 6a and 6b.

Equation 42 may be tested for validity by allowing $c=h$, $c=d$, or $\epsilon_1=\epsilon_2$ and in each case (42) reduces to $$Z_0 = \frac{60}{\sqrt{\epsilon_1}} \ln \operatorname{ctn} \frac{d\pi}{4h}$$

which for small values of $d/h$ becomes $$Z_0 = \frac{60}{\sqrt{\epsilon_1}} \ln \frac{4h}{d\pi}$$

which is recognized as Equation 10.

A numerical example will illustrate the effect of removing the solid dielectric surrounding the center conductor. Assume three transmission lines all having the dimensions, with reference to Fig. 5, of $d=.003''$ and $h=.125''$, but with the first having air dielectric, the second having all solid dielectric with $\epsilon=3.3$, and the third having two dielectrics, one being air ($\epsilon_2=1$) and the other having a dielectric constant $\epsilon_1=3.3$ with $c=.115''$.

For the air dielectric case, substituting in Equation 10, $$Z_0 = 60 \ln \frac{.5}{.003\pi} = 238 \text{ ohms}$$

For the solid dielectric case, substituting in (10), $$Z_0 = \frac{60}{1.82} \ln \frac{.5}{.003\pi} = 131 \text{ ohms}$$

For the two dielectric case, substituting in Equation 42, $$a = \ln \operatorname{ctn} \frac{.115\pi}{.5} = .126$$

$$b = \ln \operatorname{ctn} \frac{.003\pi}{.5} = 3.97$$

$$Z_0 = \frac{60}{1.82}[3.97(3.3 \times 3.84 + .126)]^{1/2} = 235 \text{ ohms}$$

Therefore it is seen that by removing the solid dielectric surrounding the center conductor to the extent of $C=.115''$ an effective dielectric constant $$\epsilon_{eff} = \left(\frac{238}{235}\right)^2 = 1.026$$

only slightly greater than that for air and a characteristic impedance equal to 95% of that for air can be obtained.

Returning to the problem of designing the inductive sections for the specified low pass filter, the required characteristic impedance $Z_{01}$ of the inductive sections $l_1$ (Fig. 1) was found by Equation 9 to be 142 ohms. In utilizing Equation 42 to determine the values of $c$ and $d$ that will give the required characteristic impedance either a suitable value of $c$ may be assigned and the required value of $d$ computed or a suitable value of $d$ may be selected and the required value of $c$ computed. The latter procedure will be employed in this problem.

Assuming a 12 mil center conductor ($d=.012''$) the first step is to compute $b$ as follows:

$$b = \ln \operatorname{ctn} \frac{d\pi}{4h} = \ln \operatorname{ctn} \frac{.012\pi}{.5} = \ln \operatorname{ctn} 4.32° = 2.585$$

Substituting this value of $b$ along with the values of $Z_{01}$, $\epsilon_1$ and $\epsilon_2$ in (42) and solving for $c$ $$142 = \frac{60}{\sqrt{2.59}}\left[2.585\left(\frac{2.59}{1}(2.585-a)+a\right)\right]^{1/2}$$

from which $$a = .676$$

Substituting the value of $a$ and the specified value of $h$ in the expression $$a = \ln \operatorname{ctn} \frac{c\pi}{4h}$$

gives $$.676 = \ln \operatorname{ctn} \frac{c\pi}{.5}$$

or $$\operatorname{ctn} \frac{c\pi}{.5} = \ln^{-1} .676 = 1.966$$

and $$\frac{c\pi}{.5} = \operatorname{ctn}^{-1} 1.966 = 26.95° = .471 \text{ radians}$$

from which $$c = \frac{.5 \times .471}{\pi} = .075''$$

The value of $s$ (Fig. 5) may also be determined by substituting in the equation for $s$ given above with Equation 42

$$s = \frac{.25}{\pi}\cosh^{-1}\frac{1+e^{-1.352}}{1-e^{-1.352}} = \frac{.25}{\pi} \times 1.12 = .089''$$

The cross section of a strip line inductive section proportioned in accordance with the above specific problem is shown in Fig. 7. The solid dielectric has been removed along cylindrical surfaces rather than along the computed equipotential surface, shown dotted, by making equal cylindrical cuts in each half of the line before assembly. The radius of the cylindrical cuts is made such that the equipotential surface is approximated as closely as possible and in the example shown is .06". The width of the cylindrical cut may be computed by the formula

(43) $\quad w = 2(2rd - d^2)^{1/2}$ where $r$ is the radius of the cutting tool
$d$ is the depth of the cut and equals $$\frac{c}{2}$$

The use of cylindrical cuts offers certain advantages in fabricating the line and produces substantially the same electrical result as removing the dielectric along the true equipotential surface.

Construction details of the inductive sections are further illustrated in Fig. 8 which shows a portion of one-half of a low-pass filter of the type shown in Fig. 1 having inductive sections $l_1$ proportioned as in Fig. 7. The center conductor is shown in place and is lightly soldered to the wide rectangular center conductors of the capacitive sections which have lengths $l_2$. The other half of this portion of the filter is identical to Fig. 8 except that no center conductor is attached.

As seen in the foregoing example, the removal of the proper amount of solid dielectric around the center conductor permitted the required characteristic impedance of 142 ohms to be obtained in a strip transmission line having the dimensions specified in the example. The effect of removing the dielectric from around the center conductor was to reduce the effective dielectric constant of the insulating material in the line section thus raising the characteristic impedance, as may be seen from Equation 6. The resulting effective dielectric constant is given by the following relation, which may be derived from Equation 6:

(44) $\quad \sqrt{\epsilon_{eff}} = \dfrac{Z_0 \text{ for air dielectric}}{Z_0 \text{ for dielectric of } \epsilon = \epsilon_{eff}} = \dfrac{155}{142} = 1.09$ or $$\epsilon_{eff} = 1.19$$

This compares with the value of $\epsilon = 2.59$ for the solid dielectric used. Also, by way of comparison, the maximum characteristic impedance that could have been attained in a conventional strip line section of the dimensions and dielectric constant specified in the problem and considering a rectangular center conductor width of .010" as the minimum feasible with photo etching techniques, is 115 ohms, this value being found by substituting in Equation 10 using $d = .00715''$, obtained from Fig. 4 as the equivalent of a rectangular conductor of width $w = .010''$, and thickness $t = .0026''$:

$$Z = \frac{60}{\sqrt{2.59}} \ln \frac{4 \times .125}{.00715\pi} = 115 \text{ ohms}$$

Referring again to Fig. 1, substantially all of the inductance $L_1$ is supplied by the length $l_1$ of high impedance transmission line. Therefore, in accordance with Equation 1, the inductance $L_1$ may be expressed as follows:

(45) $\quad L_1 = \dfrac{Z_{01}l_1}{v} = \dfrac{\sqrt{\epsilon_{eff}}Z_{01}l_1}{v_0}$ where $v_0$ is the velocity of propagation in air.

The wavelength at the cut-off frequency is

(46) $\quad \lambda_c = \dfrac{v_0}{f_c\sqrt{\epsilon}}$

Therefore

(47) $\quad l_1 = \dfrac{\theta_{1c}}{360} \times \dfrac{v_0}{f_c\sqrt{\epsilon_{eff}}}$ Substituting (47) in (45)

(48) $\quad L_1 = \dfrac{Z_{01}\theta_{1c}}{360 f_c}$

If a conventional strip line inductive section, with $W = .010''$ and $Z_0 = 115$ as above, where employed in the problem the inductance, with primes indicating the $Z_{01}$ and $\theta_{1c}$ of the conventional section, would be

(49) $\quad L_1 = \dfrac{Z_{01}'\theta_{1c}'}{360 f_c}$

Since $L_1$ must be the same in both cases, it being fixed by the cut off frequency and working impedance specified in the problem (48) and (49) may be equated giving

(50) $\quad Z_{01}'\theta_{1c}' = Z_{01}\theta_{1c}$ from which $$\theta_{1c}' = \frac{Z_{01}}{Z_{01}'}\theta_{1c} = \frac{142}{115} \times 40° = 49.5°$$

Therefore, with conventional design, the nearest approach possible to the requirement that $\theta_{1c} = 40°$, i.e. that the first spurious response should not occur at a frequency lower than 4.5 $f_c$, would be 49.5° with a resulting lowering of the first spurious response frequency to $$\frac{180}{49.5}f_c \text{ or } 3.6f_c$$

The two dielectric technique may be employed in all of the constant-K sections of Fig. 1. It may also be employed for inductive sections $l_3$ if necessary, however, $l_3$ is not required to supply as much inductance as $l_1$ and therefore it is often possible to use a conventional strip line inductive section at this point. To determine this for the above problem it is first necessary to compute $L_1$ from Equation 48.

(51) $\quad L_1 = \dfrac{142 \times 40}{360 \times 1875 \times 10^6} = .00841 \times 10^{-6}$ henry As seen in Fig. 1, the length of line $l_3$ must produce an inductance $L_3$ which, for $m = 0.6$, is

(52) $\quad L_3 = \dfrac{L_1}{2} + \dfrac{0.6 L_1}{2} = .8 L_1$

Therefore $$L_3 = .8 \times .00841 \times 10^{-6} = .00673 \times 10^{-6} \text{ henry}$$

Substituting this value of inductance in (48) and stipulating again that the electrical length of the inductive section $l_3$ not exceed 40° at cut off

(53) $\quad .00673 \times 10^{-6} = \dfrac{Z_{03} \times 40}{360 \times 1875 \times 10^6}$ from which the required value of $Z_0$ for the $l_3$ section is

(54) $\quad Z_{03} = \dfrac{.00673 \times 360 \times 1875}{40} = 113$ ohms

Substituting this value of $Z_{03}$ in Equation 10

(55) $\quad 113 = \dfrac{60}{\sqrt{2.59}} \ln \dfrac{4 \times 1.25}{d\pi}$ from which

(56) $\quad d = .0077''$

From Fig. 4 it is seen that the corresponding rectangular conductor has a width of .011" which can be produced by photo etching methods.

The $m$-derived shunt inductive section 14 of Fig. 1 is well within the capabilities of conventional strip line since the required inductance at this point is relatively low being .53 $L_1$ for $m = 0.6$.

I claim:

1. A strip transmission line comprising two parallel oppositely disposed plane conductors and a small center conductor situated midway between and parallel to said plane conductors, a first dielectric surrounding said center conductor, a second dielectric surrounding said first dielectric and filling the remaining space between said plane conductors, said first dielectric having a lower dielectric constant than said second dielectric and joining said second dielectric at a substantially equipotential surface.

2. A strip transmission line comprising two parallel oppositely disposed plane conductors and a small center conductor situated midway between and parallel to said plane conductors, a first dielectric surrounding said center conductor, a second dielectric surrounding said first dielectric and filling the remaining space between said plane conductors, said first dielectric having a lower dielectric constant than said second dielectric and joining said second dielectric at an equipotential surface.

3. A high impedance strip transmission line comprising two parallel oppositely disposed plane conductors separated by a solid dielectric, a possageway in said dielectric having a longitudinal axis equidistant from and parallel to said plane conductors, a small center conductor coaxial with said passageway, said passageway being larger than said center conductor and being bounded by a substantially equipotential surface.

4. A high impedance strip transmission line comprising two parallel oppositely disposed plane conductors separated by a solid dielectric, a passageway in said dielectric having a longitudinal axis equidistant from and parallel to said plane conductors, a small center conductor coaxial with said passageway, said passageway being larger than said center conductor and being bounded by an equipotential surface.

5. A high impedance strip transmission line comprising two parallel oppositely disposed plane conductors and a small center conductor between and equidistant from said plane conductors, solid dielectric in the volume defined by said plane conductors and a substantially equipotential surface surrounding said center conductor and spaced therefrom, and air dielectric in the volume between said center conductor and said substantially equipotential surface.

6. An inductive element for use in a microwave filter comprising an electrically short length of high impedance strip transmission line, said line comprising two parallel oppositely disposed plane conductors separated by a solid dielectric, a passageway in said dielectric having a longitudinal axis equidistant from and parallel to said plane conductors, a small center conductor coaxial with said passageway, said passageway being larger than said center conductor and being bounded by a substantially equipotential surface.

7. In a low-pass microwave strip line filter a series inductive section situated in cascade between two shunt capacitive sections, said sections being part of a continuous length of strip transmission line comprising two parallel oppositely disposed plane conductors separated by a continuous solid dielectric and a center conductor supported by said dielectric, said center conductor being equidistant from said plane conductors and having a longitudinal axis of symmetry equidistant from said plane conductors, said center conductor having a thin wide rectangular cross section in said capacitive sections and a small circular cross section in said inductive section, and a passageway coaxial with said axis of symmetry extending through the dielectric in said inductive section, said passageway being larger than the center conductor in said inductive section and being bounded by a substantially equipotential surface.

8. A low-pass microwave strip line filter of sandwich construction in which a thin center conductor of predetermined configuration is clamped between two equally thick strips of dielectric material the outer surfaces of which are metal clad to form the ground planes of the strip line filter, said center conductor being attached to the inner surface of one of said dielectric strips and having a longitudinal axis of symmetry lying substantially on said inner surface, said center conductor having spaced relatively wide portions forming sections of low impedance strip transmission line in the assembled filter and serving as shunt capacitive sections, a groove in the inner surface of said one dielectric strip extending between each adjacent pair of relatively wide portions of center conductor and centered relative to said axis, a fine wire stretched along said axis of symmetry and electrically and mechanically attached to said relatively wide portions, an equal number of identical grooves in the inner surface of the other dielectric strip so positioned as to be directly opposite the grooves in said one strip when the filter is assembled whereby said fine wire is surrounded by air dielectric and forms sections of high impedance transmission line serving as series inductive sections when the filter is assembled, the cross section of said grooves being such that the groove surfaces are substantially equipotential surfaces when the filter is assembled.

References Cited in the file of this patent

UNITED STATES PATENTS

| | | |
|---|---|---|
| 2,197,616 | Lehne | Apr. 16, 1940 |
| 2,409,449 | Sanders et al. | Oct. 15, 1946 |
| 2,411,555 | Rogers | Nov. 26, 1946 |
| 2,585,484 | Menes | Feb. 12, 1952 |
| 2,721,312 | Grieg et al. | Oct. 18, 1955 |
| 2,757,344 | Kostriza et al. | July 31, 1956 |

OTHER REFERENCES

Packard: "Machine Methods Make Strip Transmission Line," Electronics, vol. 27, No. 9, September 1954, pages 148–150.